United States Patent [19]

Maltby et al.

[11] 3,860,882

[45] Jan. 14, 1975

[54] CONTINUOUS CONDITION MEASURING SYSTEM

[75] Inventors: Frederick L. Maltby, Jenkintown; L. Jonathan Kramer, Devon, both of Pa.

[73] Assignee: Drexelbrook Controls, Inc., Glenside, Pa.

[22] Filed: Aug. 17, 1973

[21] Appl. No.: 389,126

Related U.S. Application Data

[62] Division of Ser. No. 141,839, May 10, 1971, Pat. No. 3,781,672.

[52] U.S. Cl. ............... 330/26, 330/18, 330/28, 330/32, 330/85, 330/156
[51] Int. Cl. ............................................. H03f 1/08
[58] Field of Search ............ 330/18, 32, 28, 26, 70, 330/85, 156

[56] References Cited
UNITED STATES PATENTS
3,223,938  12/1965  Brook ........................... 330/156 X

OTHER PUBLICATIONS

Towers, "High Input-Impedance Amplifier Circuits," Wireless World, July 1968, pp. 197–201, 330–26.

Primary Examiner—James B. Mullins
Attorney, Agent, or Firm—Woodcock, Washburn, Kurtz & Mackiewicz

[57] ABSTRACT

In a system which continuously measures the composition, position or size of materials, the probe has a guard shield which is effective for continuous measurement. The measurement system includes a zero adjusting impedance connected with the variable probe impedance as two adjacent arms of a balanceable bridge. A span impedance is connected between the junction of the adjacent arms and a low impedance AC source. The buffer amplifier has its input connected across the span impedance so that changes in the input impedance of the amplifier do not change the operating point of the system. A guard shield amplifier has its input connected to the output of the buffer amplifier. The guard shield amplifier maintains the guard shield at the same potential as the voltage on the probe electrode continuously for all points of operation, without significantly changing the voltage.

1 Claim, 6 Drawing Figures

PATENTED JAN 14 1975 3,860,882

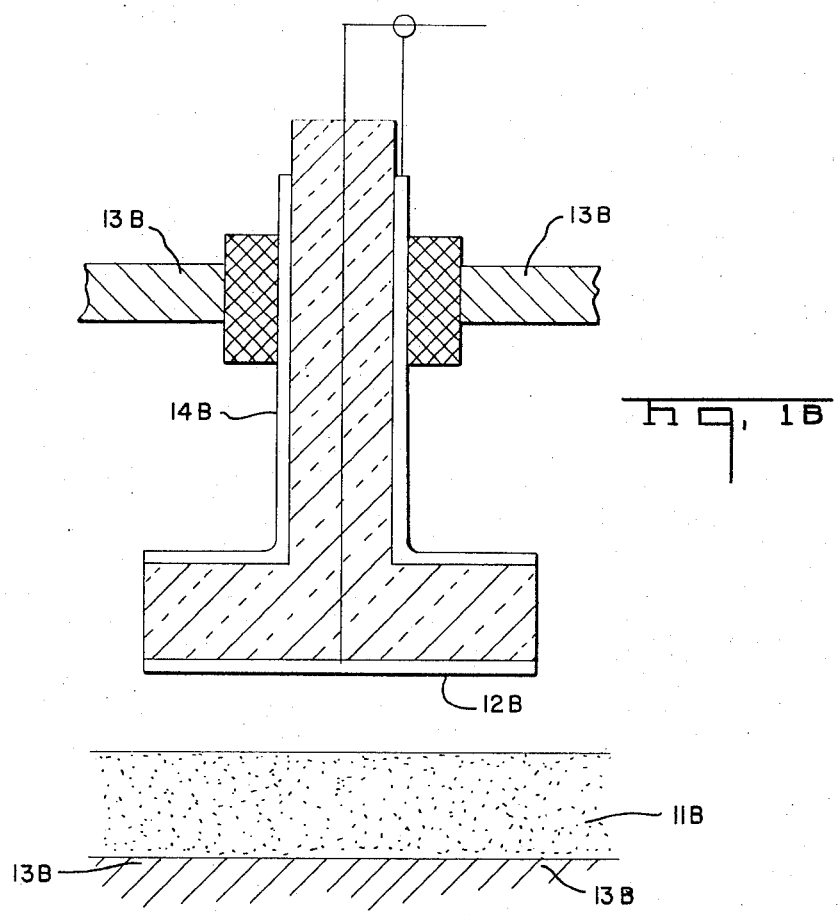

CONTINUOUS CONDITION MEASURING SYSTEM

This is a division of application Ser. No. 141,839, filed May 10, 1971, and now U.S. Pat. No. 3,781,672.

BACKGROUND OF THE INVENTION

This invention relates to radio frequency systems for measuring position, size or composition of materials and more particularly relates to a continuous measurement system.

Impedance-type measuring systems have been used for monitoring conditions in industrial processes. An example of such a system is shown in U.S. Pat. No. 3,339,412 Maltby. Such systems measure the capacitance between an electrode and a conductive member, usually the vessel containing the material whose level is to be measured. Attempts have been made to include additional electrodes in the probe, for example, to prevent stray leakage between the measuring electrode and the vessel. One example of such a system is shown in the U.S. Pat. No. 3,119,266 Atkinson.

Copending application, Ser. No. 32,002, filed Apr. 27, 1970, and now U.S. Pat. No. 3,706,980, "RF System For Measuring The Level Of Materials," Maltby, describes an improved system in which the output amplifier is connected across the span capacitor. This is an improvement over the Atkinson patent, for example, in that changes in the input impedance of the output amplifier do not change the operating point of the system. In the system described in the copending application the guard shield is effective only when the measuring circuit is at balance. This operation is acceptable for on-off control of the type particularly described in that application, but for continuous measurements provision must be made to make the guard shield active at all operating points of the system.

SUMMARY OF THE INVENTION

In a radio frequency condition measuring system the guard shield amplifier has its input connected to the output of the buffer amplifier. In accordance with this invention the buffer amplifier includes a unity gain amplifier and an amplifier having substantially 100 percent feedback capacitively coupled to the output of the unity gain amplifier to supply power to the unity gain amplifier from a source which is at the same AC potential as the output of the buffer amplifier.

The foregoing and other objects, features and advantages will be better understood from the following more detailed description and appended claims.

DESCRIPTION OF THE DRAWINGS

FIG. 1B shows another modification of the probe;

DESCRIPTION OF A PARTICULAR EMBODIMENT

Figure 1:
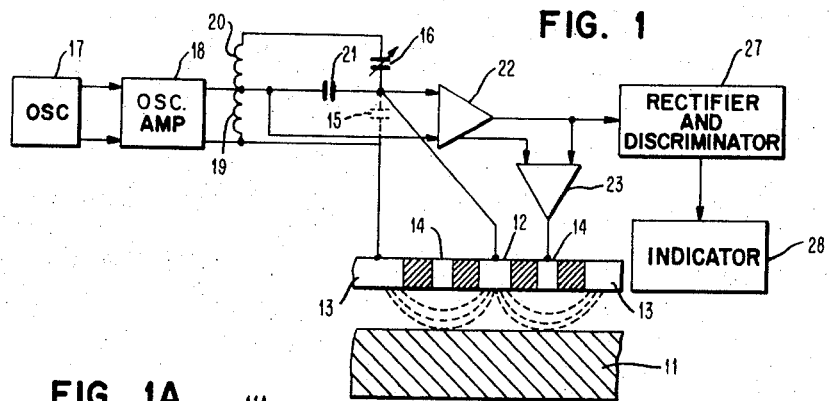
FIG. 1 shows a simplified drawing of the system of this invention.

Referring to FIG. 1 this invention is an improvement on a system responsive to the condition of material 11. The condition is measured by the variable impedance, in this case, capacitance, between the electrode 12 and a conductive member 13.

The probe includes a guard shield 14 which completely surrounds the electrode 12 except at the point of measurement.

The electrodes and the conductive member are connected through a cable to the measuring circuit. This measuring circuit produces an output representing the magnitude of the variable, unknown, impedance between electrode 12 and conductive member 13. This unknown impedance is represented by the effective capacitance 15. The measuring circuit includes a zero adjusting capacitor 16 which is connected with capacitance 15 as two adjacent arms of a balanceable bridge. When the currents through the capacitors 15 and 16 are exactly equal, the bridge is balanced and no input voltage is applied to the buffer amplifier 22.

In the embodiment shown in FIG. 1 the condition being measured is the position of the material 11. For example, in one application the measuring system is used to detect defects in tires. The system very accurately measures the position of the tire relative to the electrode 12. Because of such accurate measuring capability, the system is capable of accurately detecting differences, or defects, in the tire itself.

In the electrode arrangement of FIG. 1 the electrode 12, the conductive member 13 and the guard shield 14 all lie in a single plane. This plane is opposed to the material 11 whose condition, position, is to be measured. In this configuration, there is a fringe field between the electrode 12 and the conductor member 13 which is affected by the position of the material 11. The system of this invention measures the fringe field between the electrode 12 and the conductive member 13.

The measuring circuit is energized by a low impedance source of alternating voltage which includes the oscillator 17 and the amplifier 18. Transformer winding 19 is energized by the alternating voltage at a low impedance. The transformer, in one particular embodiment, is a 3:1 step-up transformer with the winding 20 providing means for producing a voltage proportional to, but higher than, the portion of the alternating voltage applied to winding 19. The winding 20 is connected to the zero adjusting capacitor 16.

A span capacitor 21 is connected between the junction of the adjacent arms and the junction of windings 19 and 20.

A buffer amplifier 22 has its input connected directly across the span capacitor 21. Because the buffer amplifier 22 has its input connected across the span capacitor 21 in this manner, changes in the input impedance of the buffer amplifier do not change the operating point of the system. The output of buffer amplifier 22 continuously represents the position of the material 11 in the container.

In order to prevent extraneous changes in capacitance from affecting the measurement, the guard shield 14 is interposed between the electrode 12 and the conductive member 13. Such changes may be caused by changes in cable capacitance, changes in mounting capacitance, or the presence of a thin layer of dust over the electrodes.

In order to maintain the guard electrode at the same potential as the measuring electrode 12, a guard shield amplifier 23 is provided. This guard shield amplifier 23 has its input connected to the output of the buffer amplifier 22. The output of amplifier 23 is connected to the guard shield 14 to maintain it at the same potential as the potential of the electrode 12. Because the amplifier is connected in this manner it is continuously effective to maintain the voltage on the shield 14 at the same voltage as that on the electrode at all times even when the bridge is not at balance. This is an important feature of applicant's invention because for a continuous system the guard shield must be continuously effective, even when the bridge is not a balance.

It should be noted that in the copending Maltby application the guard shield amplifier is not connected in this manner and because of this the guard shield amplifier is not effective when the bridge is out of balance. This is an acceptable condition for an on-off type system of the type described therein, but for a continuous measurement system the amplifier 23 is advantageously connected as shown in FIG. 1.

Figure 2:
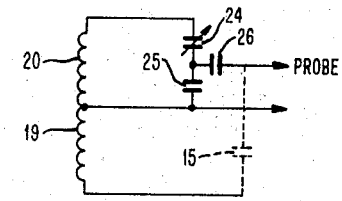
FIG. 2 shows the details of the zero adjusting network.

In accordance with another important feature of this invention, the zero adjusting capacitor, which is indicated to be the capacitance 16, is actually a zero adjusting network which includes three capacitors. This is shown in FIG. 2 wherein the zero adjusting network includes the adjustable capacitor 24 and the fixed capacitors 25 and 26. Systems of this type provide measurements sensitive to extremely small increments of capacitance changes. For example, the system being described is sensitive enough to measure capacitance increments of 0.000050 pico farads. (This may be referred to as 50 attofarads). In a system of this type it is necessary to have a zero adjusting capacitor which is adjustable in extremely small increments. At the same time, it is desirable that this capacitor be rugged. By connecting the adjustable capacitor 24 in a voltage divider network with capacitors 25 and 26, extremely small increments of effective capacitance change can be produced.

For example, in one particular embodiment the variable capacitor 24 is adjustable from effectively zero to 70 picofarads, capacitor 25 is 10.000 pf. and capacitor 26 is 7 pf. Because of the voltage divider network, a 70 picofarad range in capacitor 24 produces an effective capacitance change of 0.05 picofarads. (The effective capacitance change is given by $70/10{,}070 \times 7 \cong .05$ picofarads. In the actual embodiment being described, there is a 3:1 voltage step-up because of the transformer winding 19 and 20. Therefore, there is actually a 0.15 picofarad change in effective capacitance for a 70 picofarad change in variable capacitor 24. (The adjustment can be made readily to 0.00001 pf.) In this manner, a rugged, serviceable capacitor such as Invar and quartz having the desired capacitance range can be used.

Figure 2A:
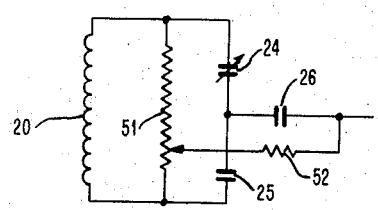
FIG. 2A shows a modification of the zero adjusting network.

FIG. 2A shows another modification of the invention in which the variable resistance 51 is added to balance out the resistive component as well as the capacitive component. The slidewire on the variable resistance 51 is connected through resistor 52 to the voltage divider network.

The advantages of the present invention over the prior art will be briefly described. In the embodiment which will be specifically described, the variable capacitance 15 changes by 0.005 picofarads for full-scale range. The span capacitor 21 has approximately 5,000 times this capacitance. The voltage across the span capacitor 21 is 1/5,000 times the voltage across the unknown capacitance 15.

Since the buffer amplifier is connected across the span capacitor 21, variations in the input impedance of the amplifier 22 will have no effect on the zero of the instrument. It will have negligible effect on the span of the instrument. For example, assuming a span capacitor of 27 pf., an input capacitance of the amplifier of 1 pf. ± 0.1 pf. and a span of 0.005 picofarads full scale, the maximum error in the span is $1/270 \times 0.005$ which is equal to approximately 0.00002 picofarads or 0.38 percent full scale. This can be contrasted to a circuit of the prior art such as that described in the aforementioned Atkinson patent where the zero error, assuming the same circuit components, is 0.1 picofarads or 2,000 percent.

Consider the advantages in the amount of power required from the amplifiers. In the system of this invention the amplifier 23 puts out only a very small voltage. At full scale the voltage output from the oscillator 17 is 10 volts peak to peak. Across the span capacitor the voltage is 0.002 volts peak to peak. That is, 10 volts peak to peak across the measuring probe gives a change of 2 millivolts peak to peak across the output of the bridge. The 2 millivolts across the span capacitor 21 is all the guard shield amplifier 23 must supply. Because the amplifier has to supply negligible power it requires negligible input power. Again contrast this with a system such as that shown in Atkinson where the error amplifier must put out a full 10 volts. Assuming the same components, this is 25 times $10^6$ as much output power as required from the amplifiers 22 and 23 in the present system. For a given amplifier the input power required and the resultant electrode circuit loading is greater than that required by the present invention by the same ratio. In the system of this invention, most of the power is supplied directly from the 10 volt peak to peak low impedance source which includes the oscillator 17 and the buffer amplifier 18. Negligible power is supplied by the amplifier 22.

Figure 3:
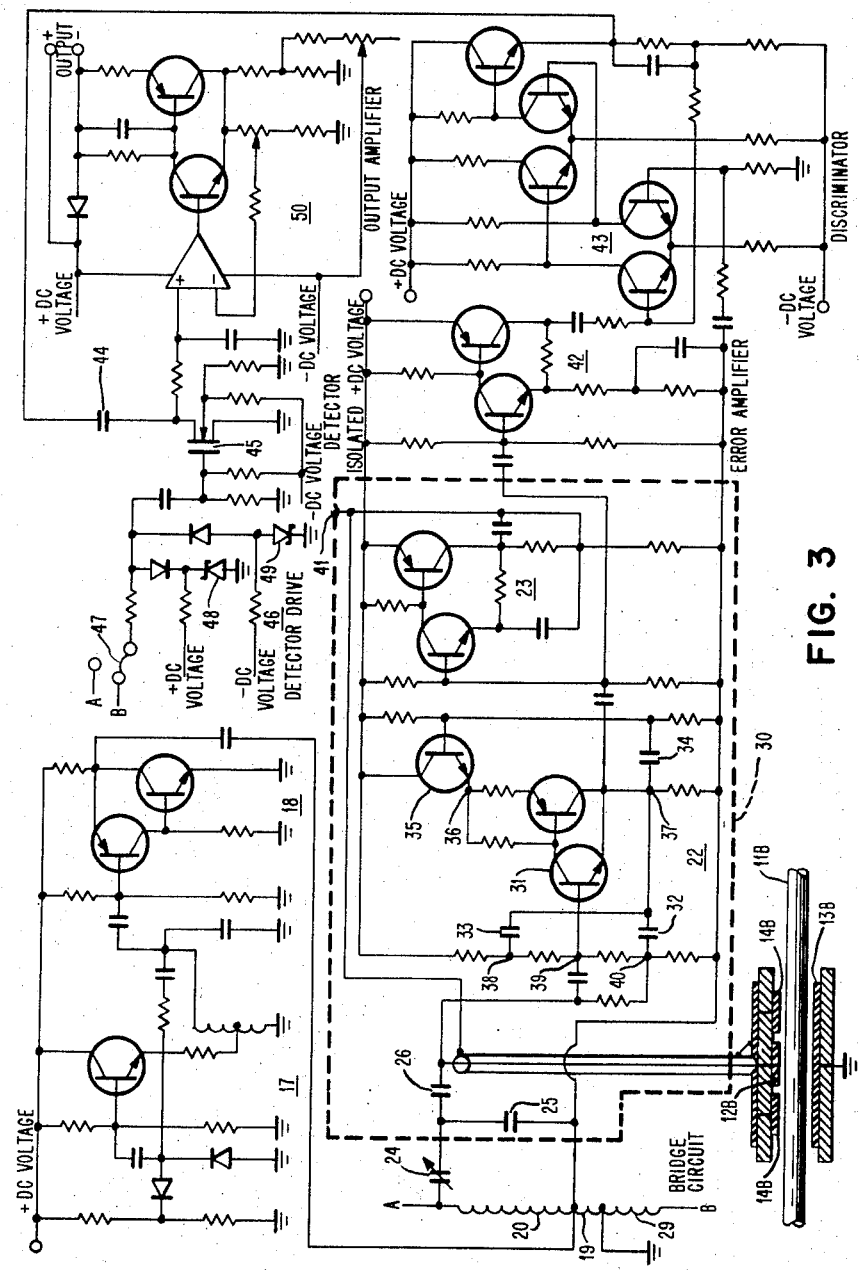
FIG. 3 is a schematic diagram of the measuring system.

FIG. 3 shows a more complete circuit diagram of one embodiment of the invention. The oscillator 17 normally produces alternating voltage of fixed frequency in the range of 100 KC to 1 megacycle. Amplifier 18 applies the alternating voltage to the windings 19 and 20. A winding 29 is provided to produce a voltage equal to but 180° out of phase with the voltage produced from the winding 20 at the point A. This voltage is used in the detector drive as will be subsequently explained.

The junction between the windings 19 and 20 is the bridge center point. The bridge circuit includes the zero adjusting network with capacitors 24, 25 and 26 as described with reference to FIG. 2. The variable impedance is the impedance between the electrode 12b and the conductive member 13b. In this embodiment the electrode 12b and the guard shield 14b are in a common plane. This is opposed to the plane in which the conductive member 13b lies. Material whose composition, or weight per unit length is to be measured passes between these two planes. As shown, the system is measuring the weight per unit length of material 11b which in this example is a granular material in a plastic tube. The system measures the amount of material in the tube and particularly is useful in detecting voids in the material.

The guard shield 14b completely surrounds the electrode 12b except at the point at which impedance is being measured, that is, the point which directly opposes the conductive member 13b. Note that the shielding extends back to the bridge circuit and that the shield is electrically connected to a metal shield 30 which completely encloses the bridge and amplifying circuits.

The buffer amplifier 22 includes a 2 stage high gain amplifier 31 with 100 percent voltage feedback. This raises the input impedance, lowers the output impedance and stabilizes the voltage transmission. The output of amplifier 31 is bootstrapped back through capacitors 32 and 33 to the amplifier input. Because of this bootstrapping, the amplifier has an input resistance of about 10 megohms. The output of the amplifier is also capacitively coupled, through capacitor 34, to the emitter follower 35. This supplies power to the amplifier 31 from a source whose A.C. potential is the same as the potential at the input. This lowers the input capacitance to a fraction of a picofarad. Stated another way, the points 36, 37, 38 and 40 are all A.C. coupled so that all of these points follow the potential on the electrode 12b quite closely. The buffer amplifier 22 has a very low output impedance.

The output of buffer amplifier 22 is connected to the guard shield amplifier 23. The guard shield amplifier 23 drives the point 41 to electrode potential. The point 41 is electrically connected to the shielding 30, to the coaxial shield going to the probe, and to the guard electrode 14b. It is capable of driving large currents to ground while always following the probe potential.

The output of buffer amplifier 22 is also coupled to the error amplifier 42. This amplifier includes a high gain voltage amplifier with a high percentage voltage feedback and produces a small stable voltage gain. The output of the error amplifier is applied to the voltage discriminator 43. The voltage discriminator is a difference amplifier which measures the difference between the amplifier error signal and the bridge center signal. It produces an A.C. signal which is applied through capacitor 44 to the detector. The detector includes a field effect transistor (FET) 45. The detector drive circuit 46 produces an A.C. signal which is applied to the gate of the FET 45. A switch 47 can connect either phase of an A.C. signal to the detector drive circuit. The switch 47 is in one position to obtain an upscale reading with increasing capacitance and in the other position to obtain an upscale reading with decreasing capacitance.

Two biased Zener diodes 48 and 49 are used to provide effectively a square wave signal which is applied to the gate of FET 45. This square wave signal alternately renders the FET 45 conducting or nonconducting. This connects the input signal to ground or connects it to the output amplifier 50. The output of output amplifier 50 represents the condition of the material.

Various modifications are within the scope of the invention. While the embodiment described includes both a buffer amplifier 22 and a guard shield amplifier 23, it will be appreciated that these separate amplifiers could be replaced with common amplifying means. Since the output of shield amplifier 23 is at the potential of the electrode and the output of buffer amplifier 22 is at the electrode potential, one common amplifier could be used to drive both of these outputs.

While the invention has been described as applicable to a capacitance measuring system, the invention is equally applicable to other impedance measuring systems.

Figure 1A:
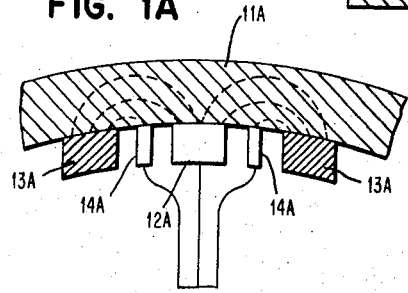
FIG. 1A shows a modification of the probe.

Another modification of the invention is shown in FIG. 1A. In FIG. 1A the composition of the material 11a is being measured. Probe 12a, conductive member 13a and guard shield 14a are all arranged in a curvilinear arc. Again, there is a measurement of the fringe field between the probe 12a and the conductive member 13a. This arrangement is particularly suitable for measuring, for example, the water content of paper. The paper is laid over the curved surface which insures a good contact between the paper and the probes. There are no air pockets between the paper and the probes which could interfere with the capacity measurement.

Another modification is shown in FIG. 1B. In FIG. 1B the level at a fluid material 11b is being measured. If the material 11b is insulating, the grounded container is the conductive member 13b. If the material is hightly conductive, the material itself will function as the conductive member 13b. This is particularly suited to the measurement of molten glass. The surface of the material 11b is substantially parallel to the conductive electrode 12b.

While a particular embodiment of the invention and certain modifications have been described, other modifications may be made. The following claims are therefore, intended to cover any such modifications within the true spirit and scope of the invention.

What is claimed is:

1. A buffer amplifier comprising:
a unity gain amplifier which includes:
a high-gain amplifier,
a second amplifier directly coupled to said high-gain amplifier, said second amplifier providing a substantially 100 per cent voltage feedback to said high-gain amplifier, the output to said unity gain amplifier being capacitatively bootstrapped to the input of said unity gain amplifier, said input acting as the input to said buffer amplifier,
an emitter follower amplifier capacitatively coupled to the output of said unity gain amplifier to supply power to said unity gain amplifier from a source which is of the same A.C. potential as the output of said buffer amplifier, and
a capacitative coupling between the output to said buffer amplifier and the input to said unity gain amplifier.

* * * * *